United States Patent [19]

Keita et al.

[11] Patent Number: 5,705,754
[45] Date of Patent: Jan. 6, 1998

[54] CORIOLIS-TYPE MASS FLOWMETER WITH A SINGLE MEASURING TUBE

[75] Inventors: Mamadi Keita, Basel; Ennio Bitto, Aesch; Ole Koudal, Reinach, all of Switzerland

[73] Assignee: Endress & Hauser Flowtec AG, Reinach, Switzerland

[21] Appl. No.: 721,462

[22] Filed: Sep. 27, 1996

[30]     Foreign Application Priority Data

Oct. 26, 1995 [EP]  European Pat. Off. ............ 95116834
Jun. 10, 1996 [EP]  European Pat. Off. ............ 96109242

[51] Int. Cl.⁶ ................................................. G01F 1/78
[52] U.S. Cl. ................. 73/861.357; 73/861.354
[58] Field of Search ................ 73/861.351, 861.354, 73/861.355, 861.357

[56]             References Cited

U.S. PATENT DOCUMENTS

| | | | |
|---|---|---|---|
| 4,813,289 | 3/1989 | Lew | 73/861.357 |
| 4,891,991 | 1/1990 | Mattar et al. | 73/861.357 |
| 5,044,208 | 9/1991 | Corown et al. | 73/861.354 |
| 5,261,284 | 11/1993 | Hopkinson . | |
| 5,275,061 | 1/1994 | Young et al. | 73/861.357 |
| 5,307,689 | 5/1994 | Nishiyama et al. . | |
| 5,551,307 | 9/1996 | Kane et al. | 73/861.357 X |
| 5,557,973 | 9/1996 | Koudal et al. | 73/861.354 X |

FOREIGN PATENT DOCUMENTS 38 24 351   5/1994   Germany .
5209768     8/1993   Japan .

OTHER PUBLICATIONS

Bopp & Reuther Brochure, Massflower Meter System Rheonik Series RHM, 1987.
K-Flow Desogn Perspective Report; Vibration Isolation and Structural Integrity: resolving the remaining design challenges in Coriolis-based flow measurement, 1987.

*Primary Examiner*—Elizabeth L. Dougherty
*Attorney, Agent, or Firm*—Bose McKinney & Evans

[57]         ABSTRACT

A mass flowmeter (1) based on the Coriolis principle is disclosed whose susceptibility to disturbances originating from the conduit, such as vibrations of the conduit or wide pressure variations of the fluid, and to other disturbances, such as impacts on the casing (11), is greatly reduced by mechanical means. It has a fluid inlet (113) and a fluid outlet (114) which are connected with the conduit via the casing; a support base (12) disposed within the casing and connected with the casing via at least one mechanical damping element (13, 14) which is located on a nodal line of vibration (19) of the support base; a single measuring tube which is bent in a plane parallel to the support base and ends in the fluid inlet (113) and the fluid outlet (114), a portion of said measuring tube to be vibrated in a direction perpendicular to said plane being fixed to the support base by fixing means (121, 122) located in the areas of opposite edges of the support base, and two connecting portions (152, 153) of said measuring tube extending from the respective fixing means to the fluid inlet and the fluid outlet, respectively; a vibrator (16); and at least one respective sensor (17, 18) disposed near each of the fixing means for sensing the vibrations of the tube portion.

24 Claims, 1 Drawing Sheet

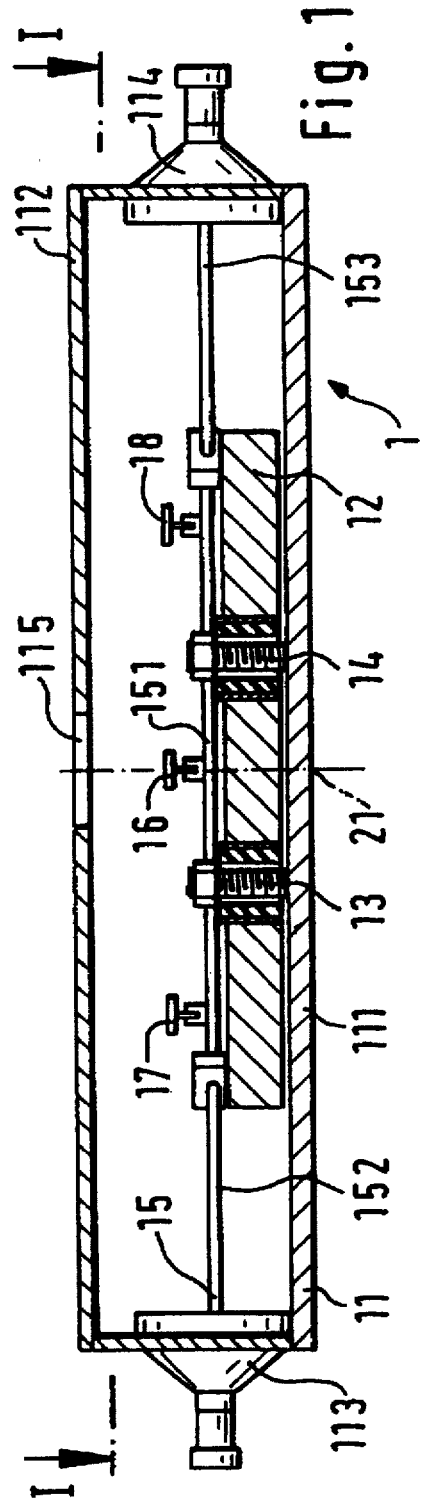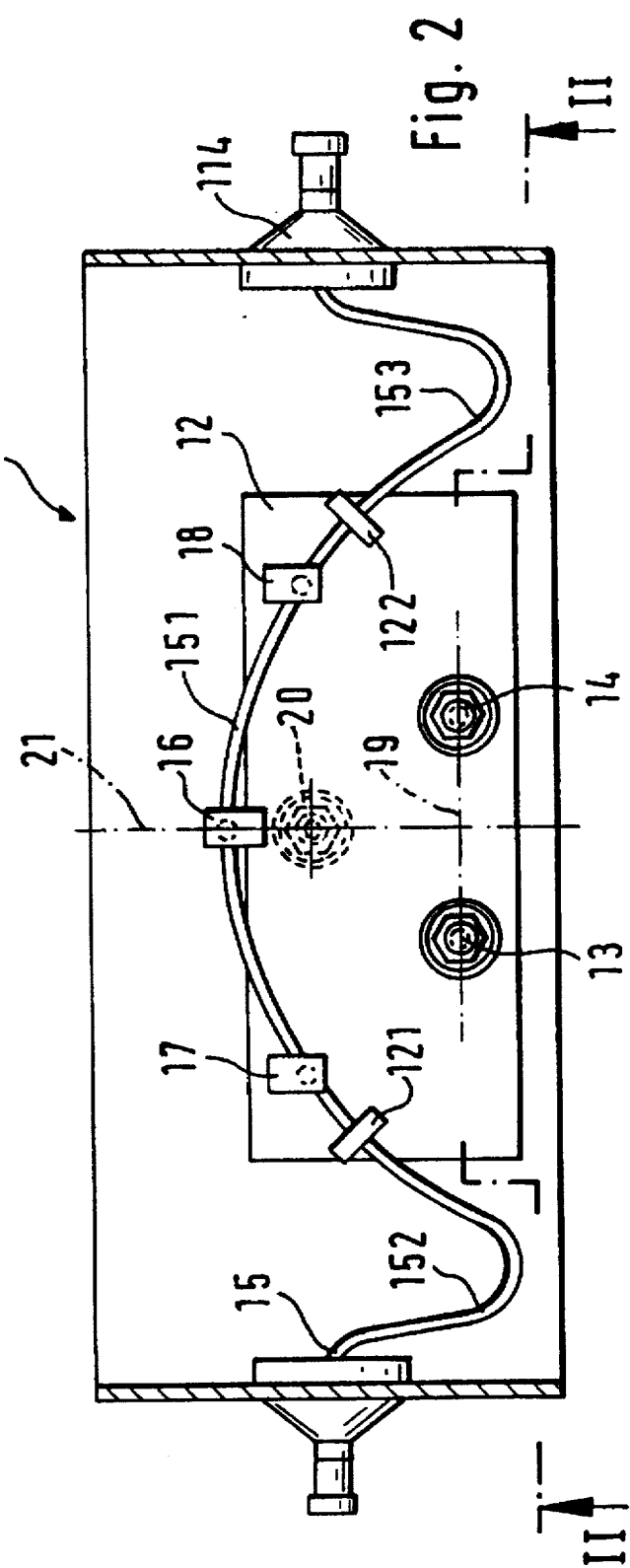

CORIOLIS-TYPE MASS FLOWMETER WITH A SINGLE MEASURING TUBE

FIELD OF THE INVENTION

The present invention relates to a Coriolis-type mass flowmeter with a single measuring tube.

BACKGROUND OF THE INVENTION

As is well known, mass flowmeters are suitable for measuring the mass flow rate and/or the density of fluids flowing in a conduit in which the mass flowmeter is installed.

Unlike Coriolis-type mass flowmeters with at least two measuring tubes, which can be made relatively immune to disturbances originating from the conduit, such as vibrations of the conduit or wide pressure variations of the fluid, Coriolis-type mass flowmeters having only a single measuring tube are sensitive to such disturbances, but also to other disturbances acting on them, such as impacts on the casing.

In a more or less successful effort to eliminate this disadvantage, a mass flowmeter based on the Coriolis principle is described in U.S. Pat. No. 5,307,689 which can be installed in a conduit out of alignment therewith, and which during operation is traversed by a fluid to be measured, comprising:

a support base
which is placed on a floor surface via at least one mechanical damping element;

a single measuring tube bent to a U or J shape in a plane parallel to a top side of the support base and traversed by the fluid,
two parallel legs of which are to be vibrated in said plane and are each fixed in a respective holding member attached to the support base;

a respective vibrator attached to each of the legs;

two sensors mounted on each of the legs near the respective holding member for sensing the vibrations of the respective leg; and excitation/evaluation electronics
which comprise a subcircuit for eliminating disturbing signals caused by external vibrations.

With this mass flowmeter, an attempt is made to eliminate the above-mentioned conduit-induced disturbances by means of circuitry, while the constructional design of the mass flowmeter does not show any measures serving to suppress such disturbances.

DE-A 38 23 351 describes a Coriolis-type mass flowmeter which can be installed in a conduit so as to be axially aligned therewith, and which during operation is traversed by a fluid to be measured, comprising:

a casing to be connected with the conduit via a fluid inlet and a fluid outlet, said casing being stiff against vibration;

a single measuring tube which is traversed by the fluid and is bent in one plane and ends in the fluid inlet and the fluid outlet, thereby being rigidly connected with the casing,
which is to be vibrated in a direction perpendicular to said plane by means of a vibrator; and at least one sensor mounted on the measuring tube in the direction of the fluid inlet and at least one sensor mounted on the measuring tube in the direction of the fluid outlet for sensing the vibrations.

In this assembly, the rigid connection between the measuring tube and the casing, i.e., a mechanical measure, is designed to keep the above-mentioned external disturbances away from the measuring tube. It has turned out, however, that sufficient suppression of the external disturbances cannot be achieved with this measure.

SUMMARY OF THE INVENTION

It is, therefore, an object of the invention to provide a Coriolis-type mass flowmeter which is made as insusceptible to the aforementioned disturbances as possible by means of further mechanical measures.

The invention therefore provides a Coriolis-type mass flowmeter which can be installed in a conduit and which during operation is traversed by a fluid to be measured, comprising:

a casing to be connected with the conduit via a fluid inlet and a fluid outlet;

a support base disposed within the casing,
said support base being connected to the casing via at least one mechanical damping element
which is located on a nodal line of vibration of the support base;

a single measuring tube, traversed by the fluid, which is bent in a plane parallel to a top side of the support base and ends in a fluid inlet and a fluid outlet,
a portion of said measuring tube to be vibrated in a direction perpendicular to said plane being fixed to the support base by fixing means provided in the areas of opposite edges of the support base, and
two connecting portions of said measuring tube extending from the respective fixing means to the fluid inlet and the fluid outlet, respectively;

a vibrator; and at least one respective sensor mounted near each of the fixing means for sensing the vibrations of the tube portion.

In a preferred embodiment of the invention, the tube portion is bent in the form of an arc of a circle, each of the connecting tube portions being preferably bent with a smaller radius of curvature than the tube portion.

In another preferred embodiment of the invention, at least one further damping element is located on that line of the support base where the plane of symmetry of the support base and the tube portion intersects the bottom side of the support base.

In a further preferred embodiment of the invention, the measuring tube has a nominal diameter of less than 10 mm, and/or the mass of the support base is large compared to the mass of the tube portion.

BRIEF DESCRIPTION OF THE DRAWINGS

The invention will now be explained in more detail with reference to the accompanying drawing, in which an embodiment of the invention is shown approximately to scale, and in which like parts are designated by like reference characters.

In the drawings:

FIG. 1 is a longitudinal section of a mass flowmeter; and

FIG. 2 is a top view of the mass flowmeter of FIG. 1 after removal of an upper part of the casing.

DETAILED DESCRIPTION OF THE DRAWINGS

A mass flowmeter 1 shown in FIG. 1 in a longitudinal section (taken along line II—II of FIG. 2) and in FIG. 2 in a top view (along line I—I of FIG. 1), which is based on the Coriolis principle and which can be installed, e.g., by means of flanges or threaded connections, in a conduit (not shown) so as to be axially aligned therewith, is traversed in operation by a fluid to be measured and has a casing 11, in which its essential parts are housed to protect them from environmental influences.

As can be seen from the figures, the mass flowmeter of the embodiment can be so installed in the conduit (not shown) that it is axially aligned with the latter.

The casing 11, as indicated in FIGS. 1 and 2, may be composed of several parts, namely a lower part in the form of, e.g., a bottom plate 111, an upper part 112, a fluid inlet 113, and a fluid outlet 114. In the finished condition of the mass flowmeter, these parts are permanently joined together.

To be able to bring electric leads into and out of the casing, the upper part 112 has an opening 115 in which a suitable bushing can be fitted.

Mounted within the casing 11 is a support base 12 which is connected with the casing, in the embodiment shown with the bottom plate 111, via at least one mechanical damping element, in FIGS. 1 and 2 the two damping elements 13, 14.

Thus, the support base 12 is not rigidly mounted on the casing 11 but is only so attached to the latter that, although it is still movable relative to the casing 11 in all directions, movements, particularly impacts or vibrations originating from the casing, will be transmitted to the support base 12 only in highly damped form, if at all; the support base 12 is therefore spaced a given distance from the bottom plate 111.

A single measuring tube 15 extends parallel to a top side of the support base 12. It is bent in a plane parallel to that top side and is traversed by the fluid. The measuring tube 15 ends in the fluid inlet 113 and the fluid outlet 114 and preferably has the form of an arc of a circle.

In the area of the support base 12, the measuring tube 15 has a portion 151 which is vibrated in a direction perpendicular to the plane in which the measuring tube 15 is bent, the vibrations being produced by a vibrator 16, e.g., an electromagnetic vibrator, particularly an electrodynamic vibrator. The mass of the support base 12 is preferably large compared to the mass of the tube portion 151.

Any of the conventional vibrator circuits can be used to produce the vibrations required for the tube portion 151, and thus for the measuring tube 15. The tube portion 151 is fixed to the support base 12 at opposite edges of the latter by fixing means 121, 122.

From the fixing means 121 and 122, connecting tube portions 152 and 153 extend to the fluid inlet 113 and the fluid outlet 114, respectively. The radius of curvature of each of the connecting tube portions 152, 153 is less than that of the tube portion 151, which preferably has the form of an arc of a circle.

Mounted on the tube portion 151 near each of the fixing means 121, 122 is a respective sensor 17, 18, e.g., an electromagnetic sensor, particularly an electrodynamic sensor, for sensing the vibrations of the tube portion 151. Mass flow rate can be determined in the conventional manner by determining the phase or time difference of the signals provided by the sensors.

The above-mentioned damping elements 13, 14 are mounted along a nodal line of vibration of the support base 12. This nodal line 19 is obtained if, with the damping elements not yet attached, the vibrating system, consisting of the measuring tube 15 and the support base 12, is excited in the useful mode and allowed to vibrate freely and the resulting nodal line is determined, e.g., by being made visible in the manner of Chladni's figures.

In FIG. 2, a further damping element 20 is indicated by dashed lines. It may be provided instead of the damping elements 13, 14 or in addition to at least one of these elements. The further damping element 20 is located on that line 21 of the support base 12 where a plane of symmetry of the support base 12 and the tube portion 15 intersects the bottom side of the support base.

What is claimed is:

1. A mass flowmeter based on the Coriolis principle which can be installed in a conduit and which during operation is traversed by a fluid to be measured, comprising:

a casing to be connected with the conduit via a fluid inlet and a fluid outlet;

a support base disposed within the casing, said support base being connected to the casing via at least one mechanical damping element which is located on a nodal line of vibration of the support base;

a single measuring tube which is traversed by the fluid and is bent in a plane parallel to a top side of the support base and ends in a fluid inlet and a fluid outlet, a portion of said measuring tube to be vibrated in a direction perpendicular to said plane being fixed to the support base by fixing means provided in the areas of opposite edges of the support base, and two connecting portions of said measuring tube extending from the respective fixing means to the fluid inlet and the fluid outlet, respectively;

a vibrator; and at least one respective sensor mounted near each of the fixing means for sensing the vibrations of the tube portion.

2. A mass flowmeter as claimed in claim 1 wherein the tube portion is bent in the form of an arc of a circle.

3. A mass flowmeter as claimed in claim 2 wherein each of the connecting tube portions is bent with a smaller radius of curvature than the tube portion.

4. A mass flowmeter as claimed in claim 1 wherein at least one further damping element is located on that line of the support base where a plane of symmetry of the support base and the tube portion intersects the bottom side of the support base.

5. A mass flowmeter as claimed in claim 1 wherein at least one further a damping element is located on that line of the support base where a plane of symmetry of the support base and the tube portion intersects the bottom side of the support base.

6. A mass flowmeter as claimed in claim 2 wherein at least one further damping element is located on that line of the support base where a plane of symmetry of the support base and the tube portion intersects the bottom side of the support base.

7. A mass flowmeter as claimed in claim 1 wherein the measuring tube has a nominal diameter of less than 10 mm.

8. A mass flowmeter as claimed in claim 2 wherein the measuring tube has a nominal diameter of less than 10 mm.

9. A mass flowmeter as claimed in claim 3 wherein the measuring tube has a nominal diameter of less than 10 mm.

10. A mass flowmeter as claimed in claim 4 wherein the measuring tube has a nominal diameter of less than 10 mm.

11. A mass flowmeter as claimed in claim 5 wherein the measuring tube has a nominal diameter of less than 10 mm.

12. A mass flowmeter as claimed in claim 6 wherein the measuring tube has a nominal diameter of less than 10 mm.

13. A mass flowmeter as claimed in claim 1 wherein the mass of the support base is large compared to the mass of the tube portion.

14. A mass flowmeter as claimed in claim 2 wherein the mass of the support base is large compared to the mass of the tube portion.

15. A mass flowmeter as claimed in claim 3 wherein the mass of the support base is large compared to the mass of the tube portion.

16. A mass flowmeter as claimed in claim 4 wherein the mass of the support base is large compared to the mass of the tube portion.

17. A mass flowmeter as claimed in claim 5 wherein the mass of the support base is large compared to the mass of the tube portion.

18. A mass flowmeter as claimed in claim 6 wherein the mass of the support base is large compared to the mass of the tube portion.

19. A mass flowmeter as claimed in claim 7 wherein the mass of the support base is large compared to the mass of the tube portion.

20. A mass flowmeter as claimed in claim 8 wherein the mass of the support base is large compared to the mass of the tube portion.

21. A mass flowmeter as claimed in claim 9 wherein the mass of the support base is large compared to the mass of the tube portion.

22. A mass flowmeter as claimed in claim 10 wherein the mass of the support base is large compared to the mass of the tube portion.

23. A mass flowmeter as claimed in claim 11 wherein the mass of the support base is large compared to the mass of the tube portion.

24. A mass flowmeter as claimed in claim 12 wherein the mass of the support base is large compared to the mass of the tube portion.

* * * * *